US006969921B2

(12) United States Patent
Yoshimatsu (10) Patent No.: US 6,969,921 B2
(45) Date of Patent: Nov. 29, 2005

(54) WORKING MACHINE (75) Inventor: Hideaki Yoshimatsu, Hyogo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 10/496,979

(22) PCT Filed: Nov. 28, 2002

(86) PCT No.: PCT/JP02/12408

§ 371 (c)(1),
(2), (4) Date: May 27, 2004

(87) PCT Pub. No.: WO03/048549

PCT Pub. Date: Jun. 12, 2003

(65) Prior Publication Data
US 2005/0012337 A1 Jan. 20, 2005

(30) Foreign Application Priority Data
Dec. 3, 2001 (JP) .............................. 2001-368953

(51) Int. Cl.[7] .......................................... F02D 29/06
(52) U.S. Cl. ................................. 290/1 R; 290/40 C
(58) Field of Search ............................. 290/1 R, 40 C (56) References Cited

U.S. PATENT DOCUMENTS 4,119,862 A    10/1978  Gocho
5,794,422 A *   8/1998  Reimers et al. ............... 56/11.9
6,607,466 B2 *  8/2003  Bordini .......................... 477/3
6,635,973 B1 * 10/2003  Kagoshima et al. ........ 307/10.1
6,857,253 B2 *  2/2005  Reimers et al. ............... 56/10.6
6,882,917 B2 *  4/2005  Pillar et al. .................... 701/48
2002/0096886 A1 * 7/2002 Schmitz et al. ............ 290/40 C
2003/0140626 A1 * 7/2003 Schenk et al. ................. 60/422
2004/0148817 A1 * 8/2004 Kagoshima et al. .......... 37/348

FOREIGN PATENT DOCUMENTS

| EP | 0265526 | 5/1988 |
|---|---|---|
| JP | 05-017387 | 3/1993 |
| JP | 7-75207 | 3/1995 |
| JP | 2001-011901 | 1/2001 |
| JP | 2001-012404 | 1/2001 |
| JP | 2001-016704 | 1/2001 |
| JP | 2001-238305 | 8/2001 |
| WO | WO 0130636 A1 * | 5/2001 |

* cited by examiner

Primary Examiner—Joseph Waks
(74) Attorney, Agent, or Firm—Oblon, Spivak, McClelland, Maier & Neustadt, P.C.

(57) ABSTRACT

A hybrid system working machine, during a normal working time, operated by a normal operation mode that the output of a power generator and the accumulated power of a capacitor are used while the engine is operated over a high-efficiency range at a low output. Switching of a selector switch to a high-speed running mode position and running operation enable long-distance and high-speed running of an increase in engine output by a high-output operation mode.

4 Claims, 6 Drawing Sheets

WORKING MACHINE

TECHNICAL FIELD

The present invention relates to a so-called hybrid system working machine, in which a power generator is driven by an engine, and appropriately utilizing both an electric power resulting from the generator and an electric power stored in a power storage means, electric motors are driven to activate both a working apparatus and traveling apparatus.

BACKGROUND ART

A hybrid system working machine is constituted such that an averaged part of the required electric power is supplied from a generator, and when the generator is deficient in the electric power to be supplied, the shortage is supplemented by the electric power stored from a power storage means, whereas when the electric power is supplied in a relatively greater amount from the generator, the surplus electric power is stored (charged) in the power storage means.

Accordingly, the power storage means repeats the charging/discharging, changing the input/output in accordance with a variation in a load.

Figure 6:
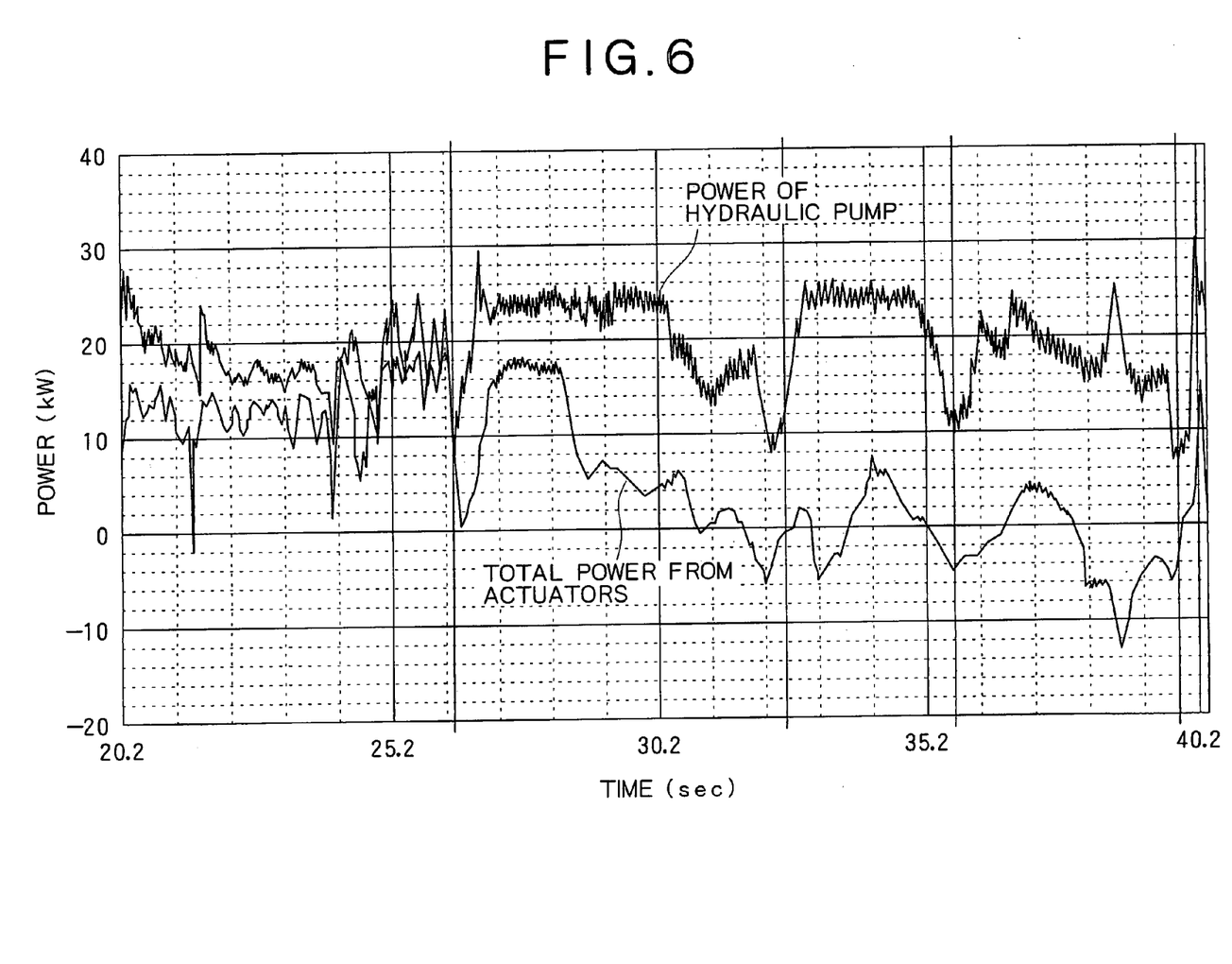
FIG. 6 is a diagram showing a general trend of the power variation in the operation of a hydraulic excavator.

FIG. 6 shows a general trend of the power variation in a conventional non-hybrid system hydraulic excavator (relationship between the time and a change in the power which is determined from data for an actual machine). Regarding the property of a hydraulic excavator receiving a strong variation in the load, it is shown that either the total power from actuators or the power from a hydraulic pump as a power source for the actuators varies significantly in a short time.

Figure 7:
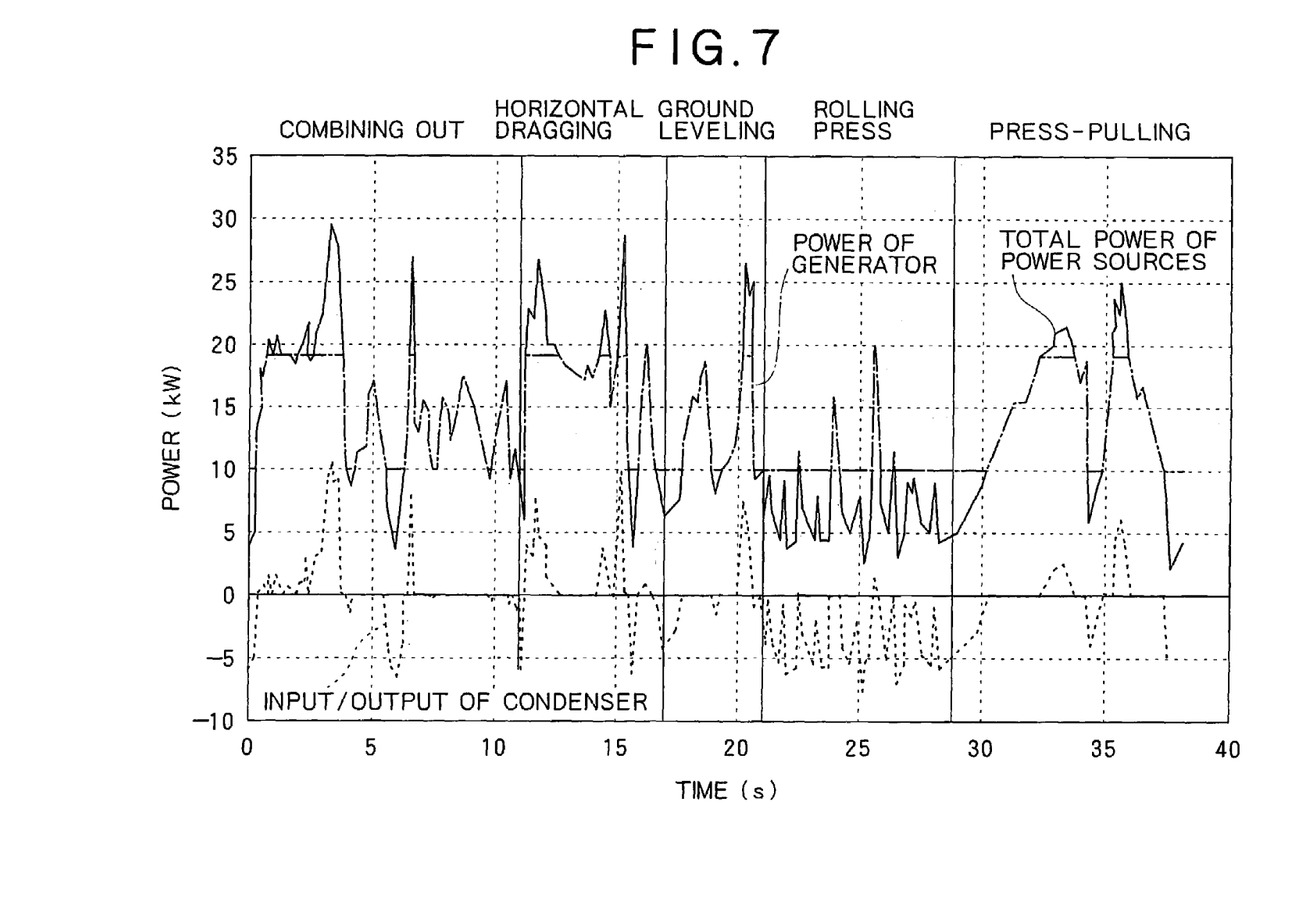
FIG. 7 is a diagram showing a trend of the power variation in various works of leveling by a hybrid system excavator.

On the other hand, FIG. 7 shows a trend (simulation) of a variation in the power for various leveling works, when a hybrid system excavator is employed.

In the case of such a hybrid system excavator, it is constituted such that the averaged power in the required power supplied from a power source, as shown by the solid line in FIG. 7, is supplied from a generator (one dot line), and that when the power is supplied in a relatively smaller amount from the generator, the shortage from the averaged power is supplemented by the power supplied from a power storage means, whereas when the power is supplied in a relatively larger amount from the generator, the surplus power is stored in the power storage means.

As a result, the output from the power storage means frequently and significantly varies, as indicated by the broken line in FIG. 7, thereby repeating inputting (charging) above the level of 0 kW and outputting (discharging) below the level thereof in a short time.

On the other hand, the excavator is constituted such that an upper rotating body is mounted onto a crawler type lower traveling body, and a excavating apparatus as a main working apparatus is mounted onto the upper rotating body, thereby making it possible either to carry out normal works (excavating, leveling and others) with the aid of the excavating apparatus, or to move in a site in the self-traveling manner with the aid of a crawler type traveling apparatus mounted onto the lower traveling body.

The movement is normally carried out in a small distance, so that it can be achieved by only the power from an engine. However, in a possible case when the excavator has to self-travel at a high speed in a relatively long distance, an assistance of the power storage means is further required.

In such a case, the power storage means has to have a greater capacity, which ensures an output for a long period, and therefore a battery (secondary battery, such as lead-acid battery, nickel hydrogen battery or the like) can be preferably employed for the power storage means.

On contrary, such a battery is operated with the aid of the chemical reaction between an electrolyte and electrodes, and therefore this causes the lifetime to become extremely short, when it is used in a working machine, such as an excavator, wherein the charging/discharging is frequently repeated due to a significant variation in the load. This eventually necessitates the exchange of the battery with high frequency, and leads to an increased cost in operation as well as to a disadvantage resulting from the environment problem due to the abandonment of batteries.

On the other hand, the employment of a capacitor (electrical double layer condenser) for such a power storage means provides a longer lifetime, even if the charging/discharging is frequently repeated. This is due to the fact that the electric charges are physically stored in the capacitor. Nevertheless, a reduced storage capacity provides a rapid consumption of charges, thereby making it difficult to travel at high speed in a long distance as described above. In the case of an empty storage, the movement or traveling has to be carried out, using only the output from the engine, so that the traveling speed is reduced and a long time is required for the movement.

As described in Japanese Unexamined Patent Application Publication No. 2000-295717, when an excavator is constituted such that it includes two type condensers, a battery and a capacitor, and that the condensers may be selectively used in accordance with the working conditions, the above-mentioned problems are solved. In this case, however, the cost of manufacturing the condensers extremely increases, along with increased complexity in the control, so that such a system is not available in the practical usage.

DISCLOSURE OF THE INVENTION

In view of these facts, it is an object of the present invention to provide a working machine which is capable of being operated in an energy-saving hybrid manner, using both the electric power from an engine and the electric power stored in a power storage means in the case of a normal working, such as the excavating and in a short distance traveling at a low speed, which is also capable of being operated in a high power as a long distance traveling at a high speed, under a prerequisite condition that only one kind of power storage means is used.

To solve the above-mentioned problems, the following feature in the structural arrangement is employed in the present invention.

In accordance with the present invention, a self-traveling working machine in which electric motors are driven both by a power generator driven by an engine and a power storage means for storing a surplus power from the power generator, and a working device and a traveling device are activated by the electric motors, characterized in that the working machine is operated with an operation mode selected from a normal operation mode that the engine is operated over a high efficiency range with both an output from the power generator and an accumulated power stored in the power storage means and a high-output operation mode that the engine is operated at a higher output than at the normal operation mode.

The working machine is, preferably, constituted such that the high-output operation mode is carried out during a high speed traveling time.

Moreover, preferably, the working machine is constituted such that it is equipped with a travel mode switching means for switching over a travel mode between a low speed travel mode and a high speed travel mode, and, when the high speed travel mode is selected by the travel mode switching means and at the same time when the traveling device is operated, the operation mode is switched over to the high-output operation mode.

Moreover, a capacitor may be used as the power storage means.

BEST MODE FOR CARRYING OUT THE INVENTION

In the following embodiments, the present invention will be described, exemplifying a hybrid system excavator as for a working machine.

First Embodiment (See FIGS. 1 to 4)

Figure 1:
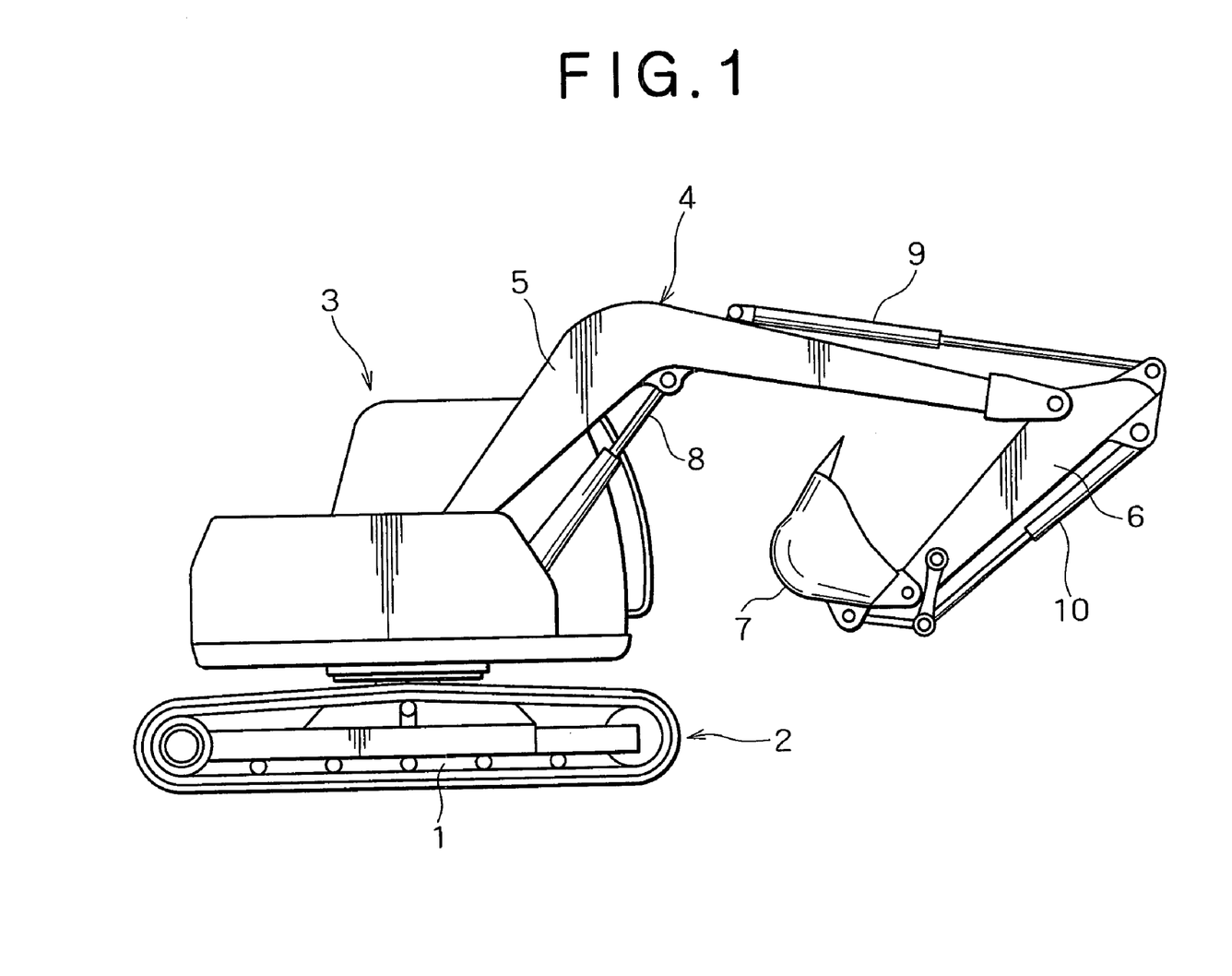
FIG. 1 is a schematic side view of an excavator in a first embodiment of the present invention.

As shown in FIG. 1, the excavator is constituted such that an upper rotating body 3 is mounted on a lower traveling body 2 which is equipped with a crawler type traveling apparatus 1 as traveling device, and that an excavating apparatus 4 as a main working apparatus or working device is mounted onto the upper rotating body 3.

In the excavating apparatus 4, an arm 6 is mounted onto an end of a boom 5 free to rise and fall, and a back hoe system bucket 7 is further mounted onto an end of the arm 6. The boom 5, arm 6 and bucket 7 are driven by a boom cylinder 8, arm cylinder 9 and bucket cylinder 10, respectively.

As a modification of the excavator, a clamshell type bucket can be employed for the bucket 7, or a griping type or vibration type crushing apparatus can be employed, instead of the bucket 7, and/or a telescopic arm can be employed for the arm 6.

Figure 2:
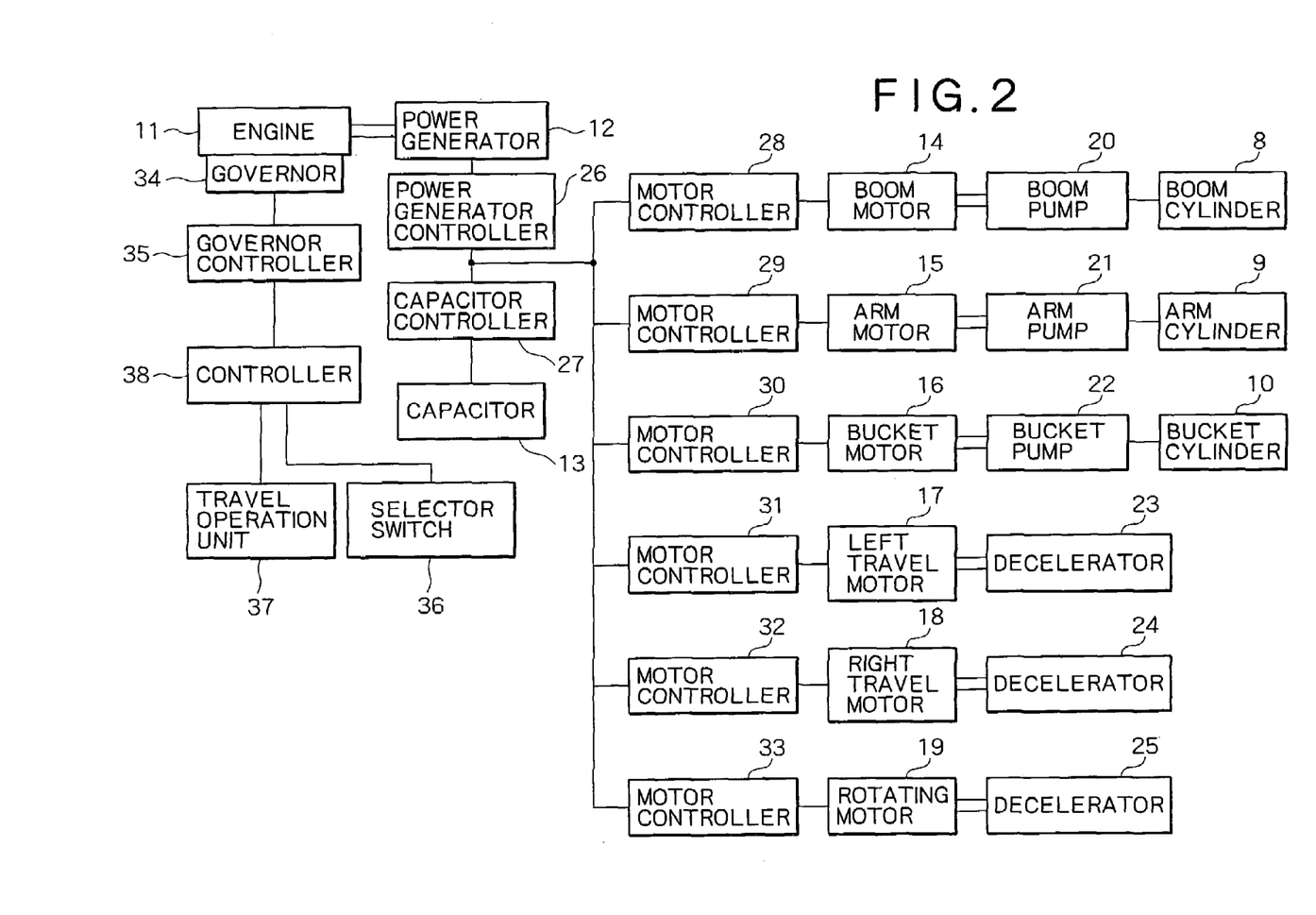
FIG. 2 is a block diagram of a driving system and control system in the excavator.

As shown in FIG. 2, the upper rotating body 3 is equipped with an engine 11 for a power source, a power generator 12 driven by the engine 11, a capacitor 13 as a power storage means, electric motors 14, 15, 16, 17, 18 and 19 being used respectively for driving the boom, arm, bucket, and for left traveling and right traveling and for rotation, a boom pump 20 driven by the boom motor 14 for supplying a pressure oil to the boom cylinder 8, an arm pump 21 driven by the arm motor 15 for supplying a pressure oil to the arm cylinder 9, a bucket pump 22 driven by the bucket motor 16 for supplying pressure oil to the bucket cylinder 10, and decelerator 23, 24 and 25 for reducing the rotary forces from the electric motors 17, 18 and 19 used for left traveling and right traveling and for rotation, and for further transmitting these rotary forces to the traveling apparatus 1 and rotating mechanisms (rotating gears, not shown).

FIG. 2 shows a block diagram of a driving system and a control system in the excavator. A power generator controller 26 is interposed between the generator 12 and the electric motors 14—19 as well as between the generator 12 and the capacitor 13. The controller 26 serves transforming an AC electric power generated by the generator 12 into a DC power by regulating it into a constant DC voltage.

Moreover, a capacitor controller 27 is interposed between the controller 26 and the capacitor 13 to control the charging/discharging of the capacitor 13 in accordance with an excess/deficiency of the power supplied from the generator, as shown in FIG. 7. Furthermore, motor controllers 28–33 for controlling the input current to corresponding electric motors 14–19 are interposed between the controller 26 and the corresponding electric motors 14–19, respectively.

The speed of the engine 11 is regulated by a governor (mechanical governor or electronic governor) 34, and the governor 34 is further controlled by the governor controller 35.

Moreover, a selector switch 36 as a travel mode switching means for selecting either a high speed traveling or low speed traveling is connected to the governor controller 35 via a controller 38. Similarly, a travel operation unit 37 for outputting a signal in the operation for traveling is connected to the governor controller 35 via the controller 38. The engine 11 is operated over a high output range, when a high-speed travel mode is selected by the selector switch 36 and at the same time the traveling apparatus is operated.

In other words, the excavator is constituted such that it can be switched over between a normal operation mode and a high-output operation mode, where, in the normal operation mode, the engine 11 is operated at a relatively low output over a high efficiency range, and then the electric power is supplied from both the generator 12 and the capacitor 13, whereas, in the high-output operation mode, the engine 11 is operated in the range of a relatively high output. Accordingly, the excavator is operated either at the normal operation mode, when the function of rotation in the upper rotating body, the function of excavation in the excavating apparatus 4 and the function of traveling in low speed are performed as in the normal work, or at the high-output operation mode, when a high speed traveling in a long distance is set respectively.

Figure 3:
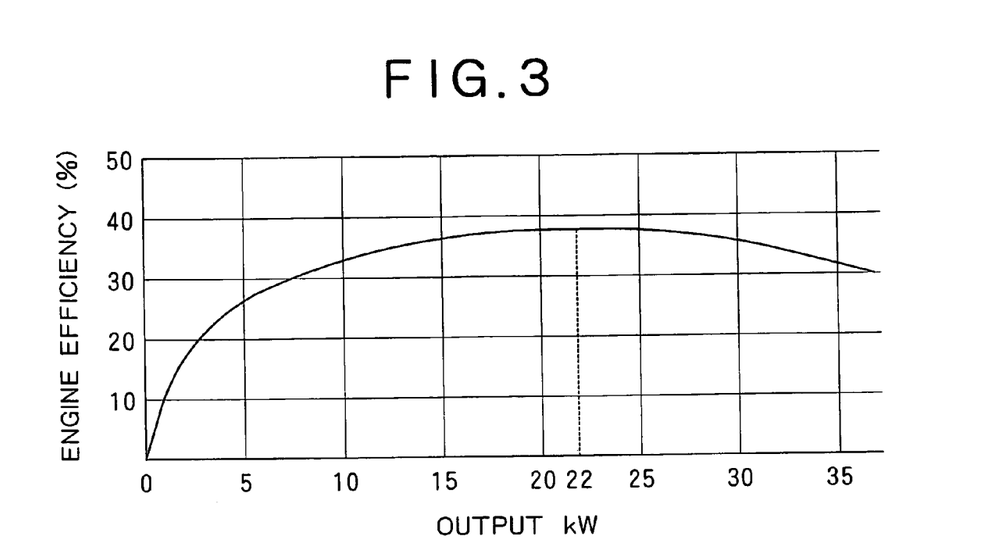
FIG. 3 is a diagram showing the state that output from the engine and its efficiency in the excavator.

In conjunction with the above, FIG. 3 exemplifies the relationship between the output and efficiency of an engine. It is found that an engine power of 22 kW provides the highest engine efficiency.

Figure 4:
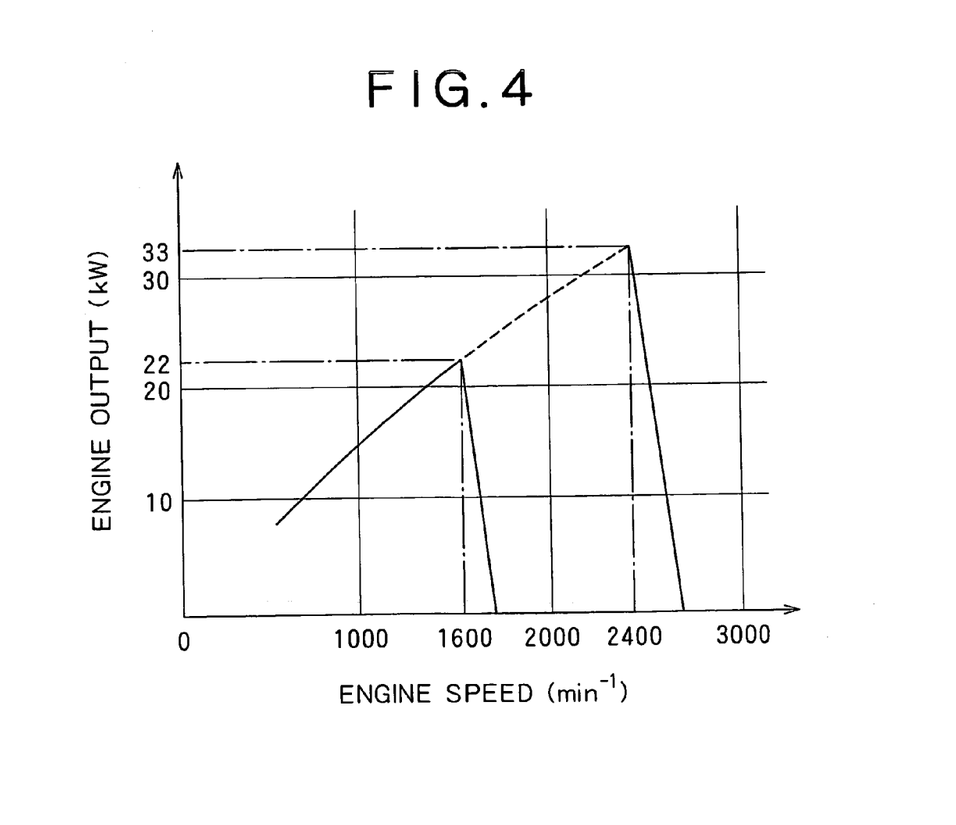
FIG. 4 is a diagram showing the relationship between the effect due to the engine speed switching and the engine output resulting therefrom.

On the other hand, FIG. 4 shows the relationship between the engine speed and the engine output in this excavator. In the normal operation mode, the engine 11 is operated over a high efficient range, as indicated by a solid line (for instance, an engine output of 22 kW being obtained at an engine speed of 1600 min$^{-1}$.), whereas the energy-saving operation, which is specific for the hybrid system excavator, can be carried out, using both the stored electric power from the capacitor 13 and that from the generator, if necessary.

In addition, the capacitor 13 used as the power storage means provides a much longer lifetime than a battery, even if a drastic change in the inputting/outputting repeatedly takes place and/or the charging/discharging is frequently repeated, as shown in FIG. 7. Accordingly, it is not necessary to exchange the capacitor 13 within the same period as the lifetime of the excavator or a further longer period. Moreover, compared with a battery, the capacitor 13 has a higher charge-storage density, thereby making it possible to efficiently use the electric power regenerated from the electric motors 14–19.

In the case that the excavator travels at a high speed and long distance in a site or others, the position of the high-speed travel mode is selected in the selector switch 36. Under this condition, the switching signal and the travel operation signal from the travel operation unit 37 are supplied to the governor controller 35 via the controller 38, so that the engine 11 is operated over a high speed range, as indicated by the dashed line in FIG. 4 (for instance, 2400 $min^{-1}$.), and therefore the engine output becomes higher (for instance, 33 kW).

An increased output of the engine causes the output of the generator 12 to be increased, for instance, in 29 kW (in the normal operation mode, it varies within a range of, e.g., 10–19 kW, depending on the required electric power).

Consequently, a long distance travel at a high speed can be achieved by only the output of the engine, even if the capacitor 13 having a small capacity is completely discharged in a short time.

Figure 5:
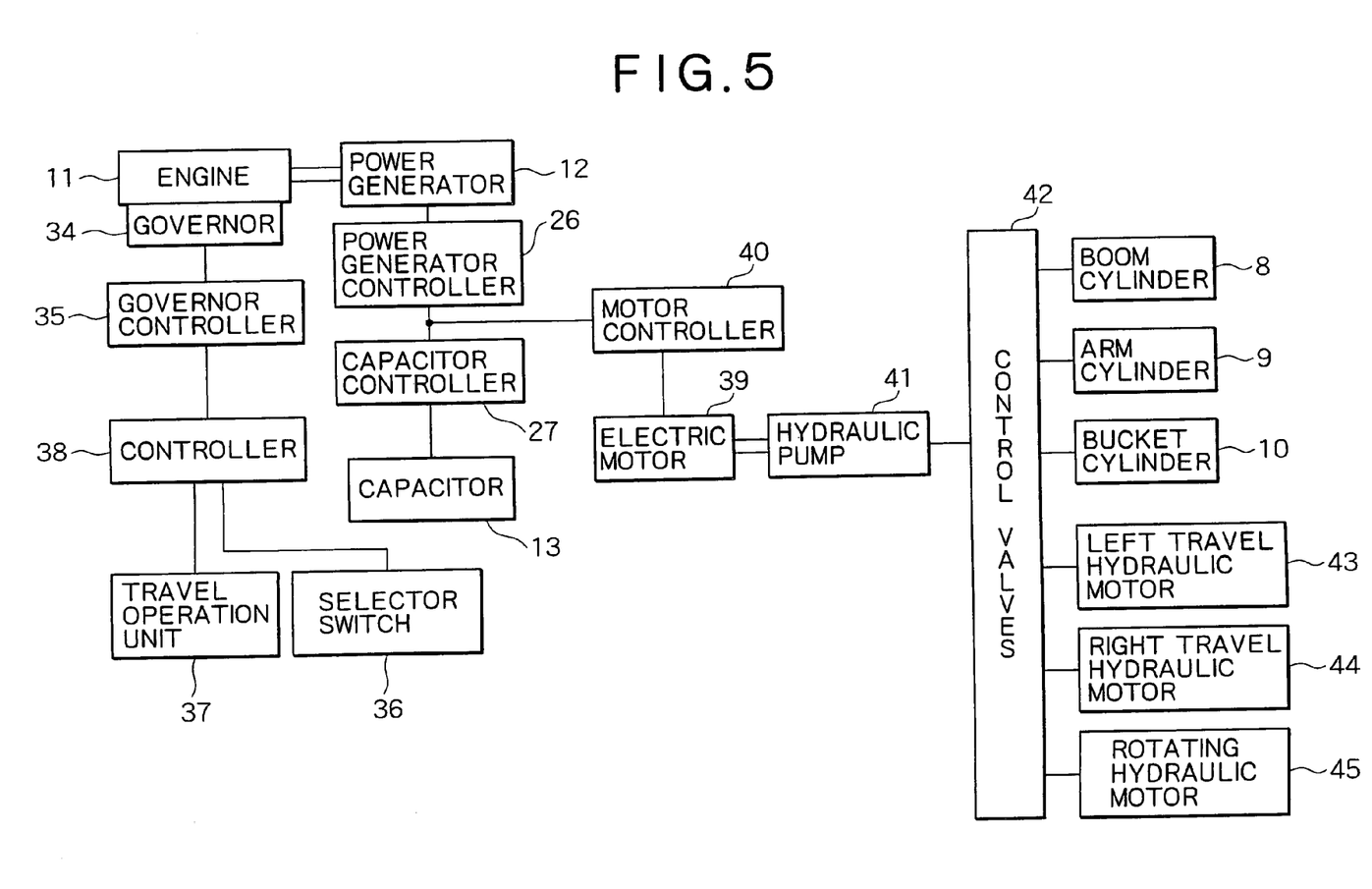
FIG. 5 is a block diagram of a driving system and control system in a second embodiment of an excavator according to the present invention.

Second Embodiment (See FIG. 5)

A second embodiment of the present invention will be described with regard to only the difference from the first embodiment.

In the second embodiment, an excavator is constituted such that a hydraulic pump 41 is driven by an electric motor 39 (controlled by a motor controller 40) to which a power generator 12 and a capacitor 13 are assigned as the electric power sources, and that the pressure oil from the hydraulic pump 41 is supplied to a boom cylinder 8, arm cylinder 9 and bucket cylinder as well as to a hydraulic motor 43 for left travel, a hydraulic motor 44 for right travel and a hydraulic motor 45 for rotation via control valves 42 (Although these valves are provided each of the hydraulic motor, here, it is collectively shown).

In the second embodiment, a selector switch 36 and travel operation unit 37 are also connected to a governor controller 35 via a controller 38. A switching signal from the selector switch 36 and a travel operation signal allow the engine output to be switched over between the high efficient range indicated by the solid line and the high power range indicated by the broken line in FIG. 4, so that the excavator is constituted such that the operation mode is changed over between the normal operation mode and the high-output operation mode.

In the case of the second embodiment, the power of the electric motor 39 increases at the high-output operation mode, and therefore both the maximum power of the hydraulic pump 41 and the amount of oil discharged therefrom also increase, so that the high speed traveling can be achieved by the increased revolution speed of the hydraulic motor 43 for the left travel and the hydraulic motor 44 for the right travel.

The Other Embodiments (1) Without usage of such a capacitor controller 27 for regulating the voltage for the capacitor 13 at a constant value, it is also possible either to control the charging/discharging current of the capacitor 13 by the controller 26 in accordance with a variation in the voltage due to the charging/discharging of the capacitor 13, or to control the current supplied to the electric motor 39 with the aid of the electric motor controller 40.

(2) Each of the motors 14–19 is assigned to the corresponding actuator in the first embodiment, whereas a common motor 39 is assigned to all of the actuators in the second embodiment. However, the flow rate for each actuator can be controlled by a corresponding valve in the distributed manner, combining two sets of an electric motor and a hydraulic pump with each other. Otherwise, only the rotary movement can be realized by driving an electric motor, and the other actuators can be activated by controlling the flow rate in the distributed manner, where the amount of discharge in one or two sets of an electric motor and hydraulic pump is controlled by a control valve. That is, the combination of electric motors for driving the actuators can be altered in various sets.

(3) As for the power storage means, it is most desirable to employ the capacitor 13 having a long lifetime, as in the above two embodiments. However, a battery (secondary cells) can also be employed when a large storage capacity is required. The usage of a battery having a large capacity allows the lifetime of the battery to be increased, because the rate of the electric power for charging/discharging to the battery capacity can be reduced.

(4) In the above embodiments, the excavator is constituted such that the operation mode is switched over from the normal operation mode to the high-output operation mode, when the selector switch 36 is switched over to the position of the high speed traveling mode, and at the same time when the traveling operation is performed. However, the excavator can be constituted such that the operation mode is switched over to the high-output operation mode, when the selector switch 36 is switched over to the position of the high speed traveling mode and at the same time the magnitude of a travel operation becomes over a predetermined value (this can be judged by a signal from the travel operation unit 37 in the high speed travel operation).

INDUSTRIAL APPLICABILITY

As described above, the working machine according to the present invention is designed such that it can be operated either at a normal operation mode where the engine is operated over a high efficiency range at a low output and the stored electric power from the power storage means is further used, or at the high-output operation mode where the engine is operated over a high output range, after the operation mode is switched over between the normal operation mode and the high-output operation mode. In the normal workings, therefore, the working machine can be operated at the normal operation mode, as in the hybrid system-specific energy-saving manner. Moreover, an operation requiring such a high power as in a long distance travel at high speed (claims 2, 3) can also be carried out, after switching over to the high-output operation mode.

For this purpose, a capacitor can be employed for the power storage means, as defined in claim 4, and therefore the specific feature of the capacitor provides a long lifetime for the power storage means without any necessity of such frequent exchanges for the battery.

What is claimed is:

1. A self-traveling working machine in which electric motors are driven as a power source both by a power generator driven by an engine and a power storage means for storing a surplus power from the power generator, and a working device and a traveling device are activated by the electric motors, characterized in that the working machine is operated with an operation mode selected from a normal operation mode that the engine is operated over a high efficiency range with both an output from the power generator and an accumulated power stored in the power storage means, and a high-output operation mode that the engine is operated at a higher output than at the normal operation mode.

2. The working machine according to claim 1, wherein the high-output operation mode is carried out during a high speed traveling time.

3. The working machine according to claim 2, wherein the working machine comprises a travel mode switching means for switching over a travel mode between a low speed travel mode and a high speed travel mode, and, when the high speed travel mode is selected by the travel mode switching means and the traveling device is operated, the operation mode is switched over to the high-output operation mode.

4. The working machine according to claim 1, wherein a capacitor is used as the power storage means.

* * * * *